United States Patent
Grasso

(10) Patent No.: US 7,283,426 B2
(45) Date of Patent: Oct. 16, 2007

(54) METHOD AND APPARATUS FOR DETECTING SUBMARINES

(75) Inventor: Robert J. Grasso, Boxford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 259 days.

(21) Appl. No.: 10/542,881

(22) PCT Filed: Mar. 30, 2004

(86) PCT No.: PCT/US2004/009720

§ 371 (c)(1),
(2), (4) Date: Jul. 19, 2005

(87) PCT Pub. No.: WO2005/026661

PCT Pub. Date: Mar. 24, 2005

(65) Prior Publication Data

US 2006/0083111 A1 Apr. 20, 2006

Related U.S. Application Data

(60) Provisional application No. 60/501,149, filed on Sep. 5, 2003.

(51) Int. Cl.
*G01H 9/00* (2006.01)

(52) U.S. Cl. .................................................... 367/149

(58) Field of Classification Search ................ 367/149, 367/141, 131; 356/484, 43
See application file for complete search history.

(56) References Cited

U.S. PATENT DOCUMENTS

| | | | | |
|---|---|---|---|---|
| 3,604,803 A * | 9/1971 | Kahn | ...................... | 356/5.04 |
| 4,867,558 A * | 9/1989 | Leonard et al. | ................ | 356/43 |
| 4,867,564 A * | 9/1989 | Sweeney et al. | .............. | 356/43 |
| 4,893,924 A * | 1/1990 | Leonard et al. | ................ | 356/43 |
| 5,270,780 A * | 12/1993 | Moran et al. | ............... | 356/5.04 |
| 5,504,719 A * | 4/1996 | Jacobs | ........................ | 367/149 |
| 2006/0083111 A1* | 4/2006 | Grasso | ....................... | 367/131 |

* cited by examiner

*Primary Examiner*—Daniel Pihulic
(74) *Attorney, Agent, or Firm*—Daniel J. Long

(57) ABSTRACT

A method for detecting, tracking and locating submarines (24) utilizes pulsed coherent radiation from a laser (12) that is projected down through a water column, with particles in the water producing speckle from backscatter of the random particle distribution, with correlation of two closely time-spaced particle-based speckle patterns providing an intensity measurement indicative of the presence of a submarine. Subsurface submarine movement provides a subsurface wake which causes movement of particles such that two closely-spaced "snapshots" of the returns from particles in the same water column can detect particle movement due to the wake. The magnitude of the speckle pattern change indicates particle movement. In one embodiment, the return signals are imaged onto an intensified CCD or APA array that capture two successive laser pulses through the utilization of dual pixel registered cameras. Note that in the subject system, phase information is converted to measurable intensity information relating to particle motion.

23 Claims, 3 Drawing Sheets

METHOD AND APPARATUS FOR DETECTING SUBMARINES

CROSS REFERENCE TO RELATED APPLICATION

This application claims rights under 35 USC § 119(e) from U.S. application Ser. No. 60/501,149 filed Sep. 5, 2003.

FIELD OF THE INVENTION

This invention relates to submarine detection and more particularly to a method for detecting sub-sea particle motion due to wake turbulence produced by a submarine.

BACKGROUND OF THE INVENTION

Detection and tracking of submarines has long been the goal of antisubmarine warfare. In the past, sonobuoys and the like have been used to sense the presence of submerged submarines through their deployment and the use of sophisticated sonar techniques. Additionally, worldwide hydrophone arrays have been utilized in an attempt to locate and track submarines.

However, with passive acoustic techniques, the development of noiseless or silent submarines oftentimes makes it impossible to detect such quiet submarines due to their quiet-running design. Moreover, installing or deploying hydrophone arrays to detect the presence of submarines is both costly and time-consuming, thus significantly limiting the search area.

With respect to magnetometers, in order to detect a magnetic anomaly, one must first have a magnetic map of the terrain against which to compare the magnetometer readings from an overlying aircraft. The development of these maps with sufficient accuracy has been problematic in the past and the isolation of the magnetometer from the aircraft itself, usually on a boom, presents it own problems.

As described in U.S. Pat. No. 4,893,294, a different system for detecting the presence of submarines by Donald A. Leonard and Harold E. Sweeney involves the sensing of thermoclines which are produced by sub-sea wake turbulence when a submarine moves through the water. As described in the Encyclopedia of Oceanography, Vol. 1, Rhodes Pairbridge Edition, pp. 402-408, Rhineholt Publishing Corporation of New York, 1996, subsurface waves are produced by the movement of a body through the water which creates so-called internal waves. The above patent describes a way to measure the internal waves by constructing a profile of ocean water temperatures as a function of depth. While techniques have been employed in the past for measuring these profiles involving the use of many temperature sensors, these are costly and time-consuming to deploy, making them unsuited to high spatial and temporal resolution coverage of large ocean areas.

In an effort to improve on the early techniques for measuring the thermoclines, thus to detect submarines by measurement of sub-surface ocean temperatures, the above-noted patent describes a system for remote temperature sensing by using a laser carried by an attack or search submarine. In this patent the remote temperature sensing device uses a pulsed laser to illuminate an area of interest which includes the thermocline region. Part of the temperature sensing device is an optical receiver which picks up the laser backscatter and uses the self-heterodyne of the wavelength-shifted Brillouin scatter with the unshifted Rayleigh scatter.

According to this patent the self-heterodyne action allows mixing of the above signals from each volume element of the illuminated water column independently by measuring the frequency of the heterodyne signal. Since the frequency is directly related to the water temperature and since time is directly proportional to depth, the resultant time-temperature pattern is said to be equivalent to a temperature test profile. Movement of a submarine through the water creates internal waves that affect this profile such that the above-noted technique is said to provide a long-persisting indication of movement of a submerged vessel.

It will be noted that the laser is a sub-sea laser which is to be mounted on a submarine that executes a search pattern in various sub-sea locations. This is inherently a slow process because of the relatively low top speed of a subsurface vessel. Secondly, the technique described in the above-mentioned patent detects a long-persisting temperature change and does not effectively locate the position of the submarine that is detected. Temperature changes persist over long periods of time such that the temperature changes engendered by the passage of a submarine can exist, for instance, over 20 miles, hardly a technique suitable for localization and tracking of a submarine. Thirdly, the system operates by detecting frequency shifts which are correlated to temperature changes. Thus, while the above technique may be able to detect wake, its ability to localize and track a submarine is questionable.

SUMMARY OF INVENTION

On the other hand, subsurface vehicles such as submarines when moving through the water can be detected in the subject invention by the detection of the movement of particles in the wake of the submarine. While the vast majority of the ocean has particles which do not move but for Brownian motion, which has a long period, when a turbulence is generated by a submarine, the particles in the wake of the submarine move violently. It is the movement of the particles that is detected in the subject invention, not temperature variation. In one embodiment a double snapshot technique is used in which a water column is illuminated by an overflying laser which projects a beam down normal to the surface of the ocean to illuminate the water column. Two laser pulses separated by between 10 and 100 microseconds produce returns which are separately detected on an array, with each of the returns producing its own speckle pattern. The speckle patterns, which are spaced apart in time by tens of microseconds, are subtracted one from the other in a cross-correlation technique, with the intensity of the cross-correlation detecting particle motion and thus the presence of a submarine wake. How the speckle patterns are formed is now described.

In the subject method, rays of backscattered light interfere among themselves. Hence, the system may be referred to as autodyne, and the system is not affected by uniform changes in ray pathlength. Since all interfering rays pass through the same medium, much larger displacements can be tolerated, and a moving air/water interface will not degrade detection performance. This self-referencing property makes the system sensitive to differential motion between scatterers and insensitive to other motion, which is a very critical characteristic for sensing underwater turbulence due to motion of the platform, sea surface, and intervening water.

Surface reflections at the air/sea interface are eliminated by range gating techniques. Moreover, the same range gating techniques are used to determine the depth of the sub-sea wake, such that only a range-gated volume of water is interrogated. The range gating thus determines the depth of the wake, with the downwardly-projected laser beam determining the position of the particles moving as a result of the passage of the submarine. Since the motions produced by the wake turbulence of a sub-sea vessel have a short period as compared to the period of Brownian motion, the subject technique is effective in detecting subsurface vehicle-produced turbulence. This is because for undisturbed ocean the particles move very little or not at all. In short, they are stationary.

Moreover, since the particle motion dies out relatively quickly as compared to thermocline temperature change reduction, the location of the subsurface vessel can be tracked to a greater degree than heretofore possible.

In one embodiment a double-pulse laser mounted on an overflying aircraft projects pulses spaced by 10 to 100 microseconds into the water. The pulsed coherent illumination of the water column produces backscatter from random particle distribution, which in turn produces speckle on a detector array. Cross-correlation of closely time-spaced speckle patterns permits the derivation of an intensity measurement that denotes particle movement. The sensor in one embodiment is range gated for depth discrimination so that only the range gated portion of the water column is read out.

The returns are imaged on an intensified CCD or APD array, with the two successive laser pulses captured by either a single fast readout or by a dual pixel registered detector array. Outputs from the double snapshot detector array enable the determination of the magnitude of speckle pattern change. The change is manifested as speckle pattern time variation, where the water motion causes the change in the speckle return. The phases of the resulting intensity variations are due to relative particle motion from the object moving through the water, with phase information converted to measurable intensity information indicative of particle motion.

In summary, a method for detecting, tracking and locating submarines utilizes pulsed coherent radiation from a laser is projected down through a water column, with particles in the water producing speckle from backscatter of the random particle distribution, with correlation of two closely time-spaced particle-based speckle patterns providing an intensity measurement indicative of the presence of a submarine. Subsurface submarine movement provides a subsurface wake which causes movement of particles such that two closely-spaced "snapshots" of returns from particles in the same water column can detect particle movement due to the wake. The magnitude of the speckle pattern change indicates particle movement. In one embodiment, the return signals are imaged onto an intensified CCD or APA array that capture two successive laser pulses through the utilization of dual pixel registered cameras. Note that in the subject system, phase information is converted to measurable intensity information relating to particulate motion.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
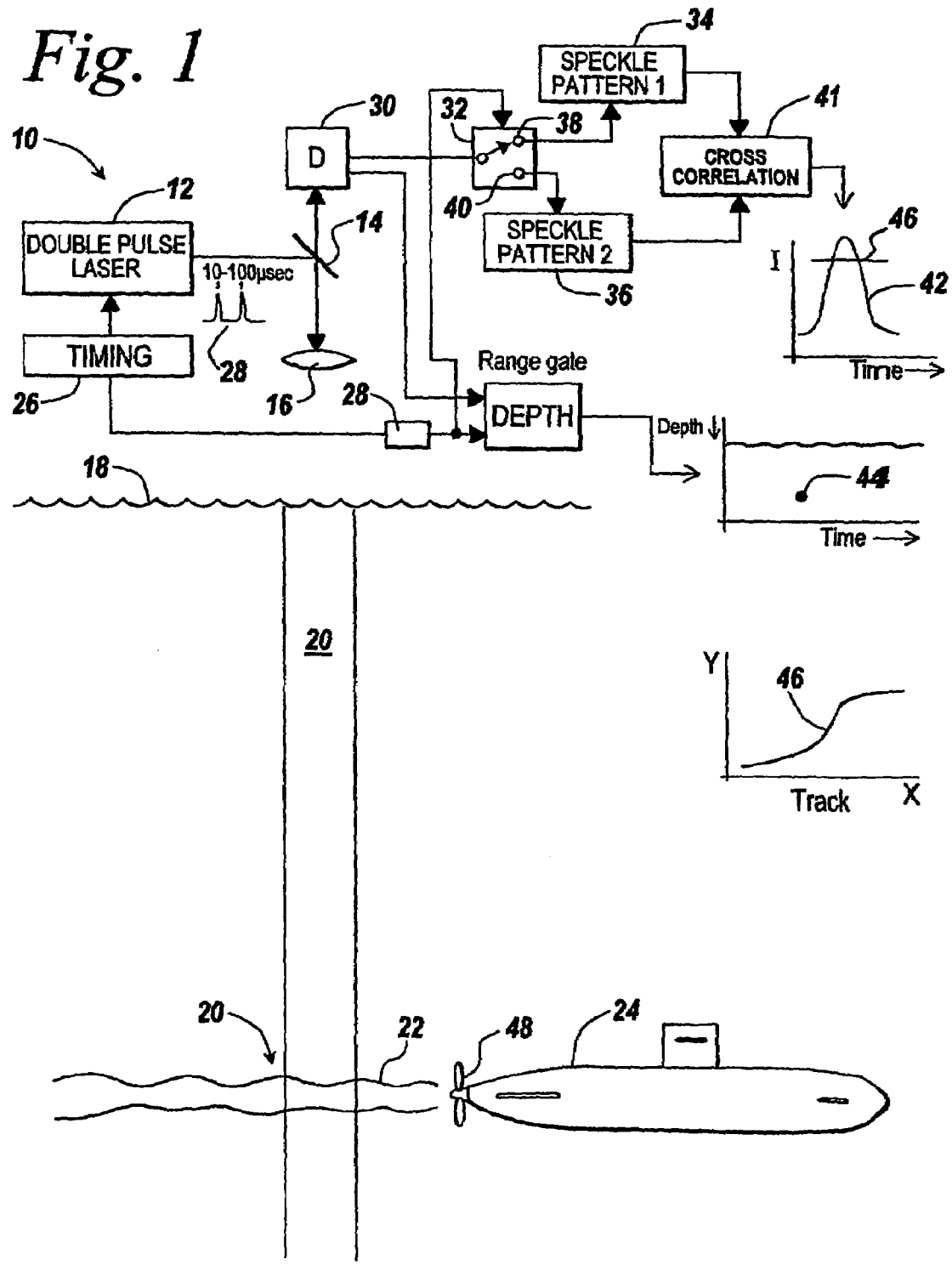
FIG. 1 is a diagrammatic illustration of the subject system illustrating the utilization of a double pulse laser illuminating a water column, with moving particles providing reflected energy in the form of a speckle pattern detected at a detector, with sequential speckle patterns being correlated to provide an intensity correlation indicating particle movement engendered by a submarine wake.

Referring to FIG. 1, in one embodiment a submarine detection system 10 includes a double pulse Nd:YAG laser 12 having its output redirected by a half-silvered mirror 14 and through optics 16 so as to illuminate the surface 18 of the ocean. Note that the second harmonic of the Nd:YAG laser is used for its green light.

The laser beam enters the water orthogonal to the water surface and defines a water column 20 extending from the surface of the ocean down through underwater waves generally indicated by 20 caused by the wake 22 of a submarine 24.

Double pulse laser 12 is controlled by a timing unit 26, which initiates the double pulse laser train 28 in which the pulse peaks are separated by between 10 and 100 microseconds. Note that in a search pattern the double pulse laser is fired repeatedly at the same area of the ocean to be able to detect returns from various ocean depths by range gating.

The initiation of the pulses from timing unit 26 is used in a variable delay circuit 28 to be able to range gate out reflections from the surface of the ocean and to specify where in the water column a range gated segment lies. Thus, the round trip travel time of the laser beam down into the water where it is reflected by particles and returned through the surface back to a detector 30 determines the depth of the segment sensed by the subject submarine detection system. By stepping delay 28, one can sample various segments of water column 20 over a number of sequential pulse pairs so that upon the detection of a submarine its depth can be ascertained. Note that, for instance, for 10 quick sequential pulse pairs one can subdivide the water column into 10 depth segments before moving on to search an adjacent water volume.

The output of detector 30 is coupled through a sequential switching mechanism 32 to provide sequential speckle patterns 34 and 36, with switch 32 switching between its two switch points 38 and 40 in a timed sequence dependent upon the expected arrival of the pulse returns from the double pulse laser. Since the timing for switch 32 is coupled to the output of delay circuit 28, the speckle patterns that are detected are only those which are within a given segment of the water column.

The sequential speckle patterns are cross-correlated on a pixel-by-pixel basis as indicated at 41 to detect movement between the speckles of the two successive speckle patterns and thus provide an overall cross-correlation value 42, the intensity of which indicates the degree of correlation or decorrelation indicating intensity. The cross-correlation curve is at a maximum when there is maximum particle movement between one speckle pattern and the next sequential speckle pattern indicating maximum decorrelation as would be expected with rapid particle movement due to a submarine wake.

As illustrated at 44, one can graphically depict an incident in which a submarine has been detected at the particular depth at which it is detected such that with a rise in curve 42 above a predetermined threshold 46, one can determine first that that series of returns in water column 20 was from a submarine wake, and second the depth 44 of the moving particles.

Since the sub-hunting apparatus 10 may be airborne, the location and direction of the output of laser 12 is known. This permits performing a search pattern by overflying a given area which is many more orders of magnitude distance than that coverable by submarine provided with the aforementioned Leonard et al. scheme.

As a result and knowing the X-Y coordinates of the laser beam spot on the surface of the ocean, one can develop a submarine track 46 in terms of hits or detections at various sequential locations. This means that the direction of travel of a submarine can be obtained.

Moreover, because the particulate motion is at a maximum close to the wheel of propeller 48 of the submarine, the degree of decorrelation is largest closest to the submarine. Thus, estimates can be made as to the closeness of the submarine to the particular water column interrogated in terms of the intensity of the decorrelation, i.e., the height of curve 42. This too leads to a determination of the direction of a detected submarine.

Additionally, the cross-correlation itself may be used to detect the direction of travel of the submarine. If over time the result of the cross-correlation is weaker, the rate of change of the sequential speckle patterns is slower in the search direction, this means that the submarine is moving in a direction opposite to the search direction. Likewise, if the correlation is stronger over time in the search direction, the search direction is in the direction of travel of the submarine.

Figure 2:
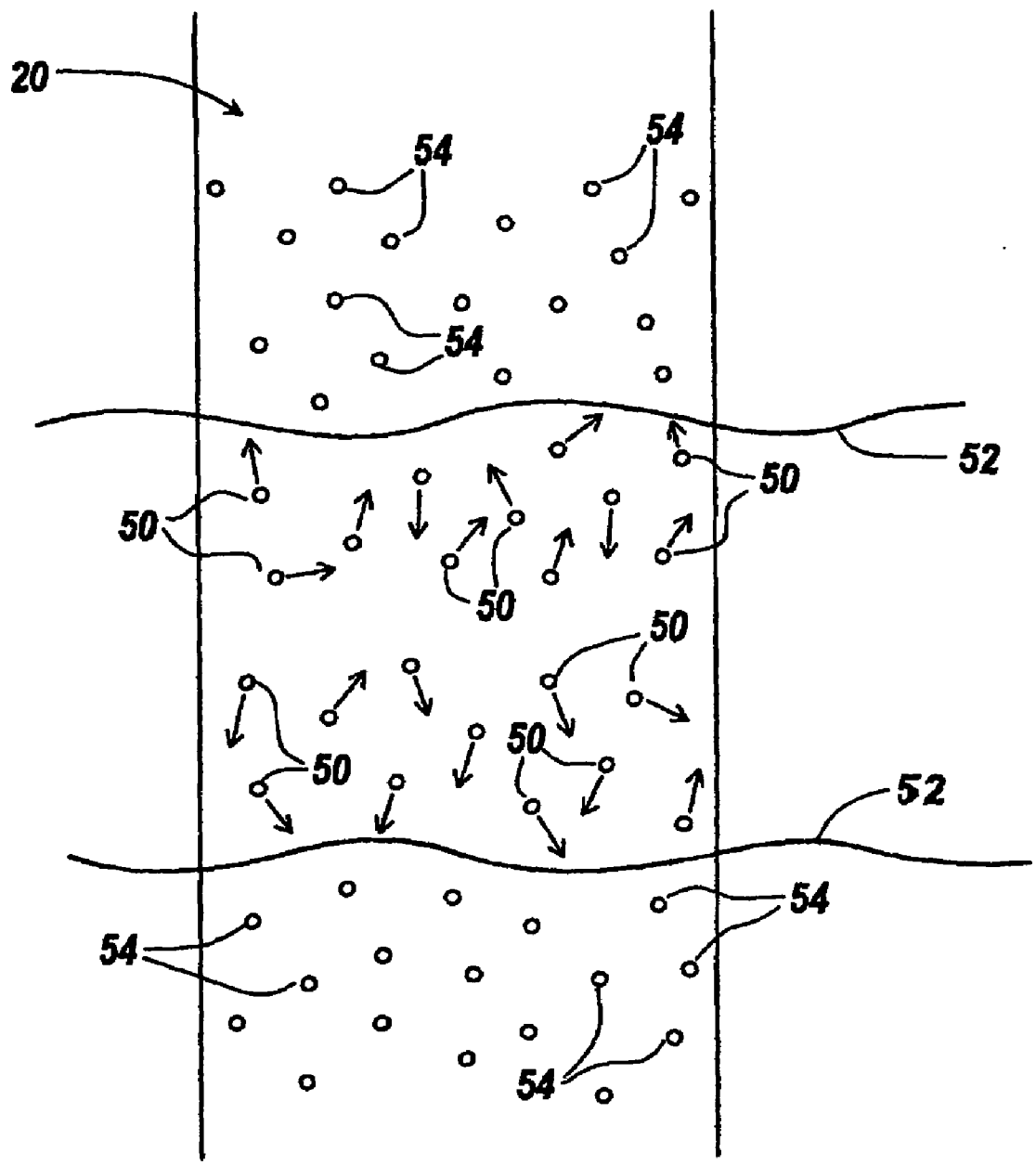
FIG. 2 is a diagrammatic illustration of the movement of particles within a water column due to the wake of a submerged vessel; and, FIG. 3 is a diagrammatic illustration of the generation of sequential speckle patterns in a range gated segment of the water column corresponding to a predetermined depth.

Referring to FIG. 2, what is illustrated is a number of particles 50 in motion when the wake envelope 52 is encountered. The particle movement is due to the wake turbulence, whereas particles 54 above and below wake envelope 52 are not in motion and are more or less stationary. Note that the period of Brownian motion which causes particles in a fluid to move is much, much larger than the period of the motion due to particles reacting to a wake.

The result is that it is possible with the subject system to detect moving particles by sequential double snapshot techniques and the cross-correlation of the results to reliably detect and to locate a subsurface vessel.

Figure 3:
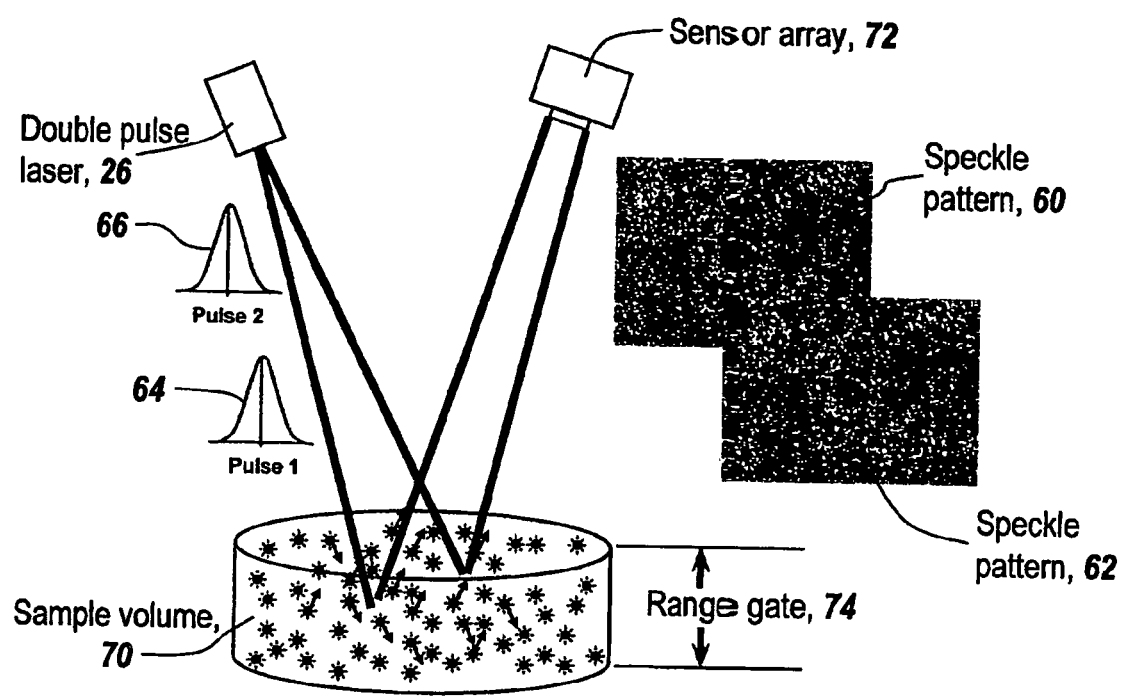

More specifically and referring now to FIG. 3, the subject technique detects turbulence originating from submarines operating in open ocean and littoral waters. The technique is based upon scattering from suspended particles present in all types of ocean water, with particles located at random positions. Backscattered laser light interferes to produce a speckle pattern as illustrated by the two speckle patterns 60 and 62, with speckle pattern variation over a short period of time indicating the presence of moving particles and thus the presence of a subsurface vessel creating a wake.

In FIG. 3, double pulse laser 26 produces the aforementioned two laser pulses 64 and 66 which define and illuminate a range gated water column 70 which forms the sample volume for the measurement. A scanner array 72 detects returns from the reflected laser radiation, with a change in the sequentially-derived speckle patterns indicating moving particles. Note that the range gating not only defines sample volume 70 as illustrated at 74, the range gating also indicates the depth of the turbulence and thus the depth of the submarine.

Thus, the backscattered light interferes to produce speckled patterns, with the subject system measuring changes in the speckle patterns produced by two successive laser pulses with a small but typically 10 to 100 microsecond pulse separation time.

Since phase information is converted into intensity information the subject method can be classified as a coherent LADAR, but not in the classical heterodyne/homodyne sense where backscattered light is interfered with a temporally and spatially coherent reference source or local oscillator.

In operation, pulsed coherent illumination of the water produces backscatter from random particle distribution, which, in turn, produces speckle. Cross correlation of speckle pattern is a measure of change over time. The sensor is range gated for depth discrimination. In one embodiment returns are imaged on intensified CCD or APD array with the two successive laser pulses captured either by a single fast readout array or a dual pixel-registered detector array. Cross-correlation of the successive speckle patterns determines the magnitude of speckle pattern change. Here, change is manifested as speckle pattern time variation where the water motion causes the change in speckle return. The phase and resulting intensity variations are due to relative particulate motion from an object moving through the water, with phase information converted to measurable intensity information related to particle motion.

Assuming a dispersed particle concentration that backscatters laser light, the signal will be dependant upon particle number density. Particles tend to remain relatively still unless disturbed. Hence there is a correspondingly long time constant effect from Brownian motion, solutions, and the like. If differential motion is present, speckle is decorrelated and the two temporal waveforms will be different. Thus correlation is low. If differential motion is absent speckle is correlated and the two temporal waveforms will be identical; thus the correlation is high.

It will be appreciated that this method permits detection of a submarine based upon its wake turbulence. Hence, it is possible to determine position and heading by sampling the water and following a pattern of increasing turbulence. Also, the sensor can be mounted in an aircraft and flown rapidly while scanning the ocean, thus providing significantly greater coverage than traditional acoustic detection methods. Since this technique does not rely upon direct echo reflection, submarines can be detected hours after they pass through a region, hence facilitating tracking.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for detecting, tracking and locating submarines in water, comprising the steps of:
   projecting monochromatic coherent radiation into a water column;
   detecting reflections from particles in the water column to generate speckle patterns; and,
   deducing from a change in the speckle patterns the presence of a submarine.

2. The method of claim 1, wherein the monochromatic radiation is generated by a double pulse laser.

3. The method of claim 2, wherein the pulses from the double pulse laser are separated by 10-100 microseconds.

4. The method of claim 1, wherein the speckle patterns are detected using an array of detectors.

5. The method of claim 1, wherein the speckle patterns are detected using an array of intensified detectors.

6. The method of claim 1, wherein the speckle patterns are detected by an array of detectors selected from the group consisting of CCD and APD arrays.

7. The method of claim 2, and further including the step of range gating the pulses from the double pulse laser so as to determine the depth of the detected submarine.

8. The method of claim 1, and further including the step of cross-correlating the speckle patterns.

9. The method of claim 2, wherein successive laser pulses produce separate speckle patterns and further including the step of utilizing dual pixel registered cameras for the detection of the two speckle patterns.

10. The method of claim 2, wherein successive laser pulses produce separate speckle patterns and wherein the detecting step includes the step of utilizing a fast readout array for detecting returns from the two laser pulses.

11. The method of claim 1, and further including the step of deducing from a change in speckle patterns the direction of travel of a submarine.

12. The method of claim 1, and further including the step of deducing the direction of travel of a submarine from successive detections of the submarine at successive locations.

13. The method of claim 1, and further including the step of deducing the direction of travel of a submarine from the level of decorrelation of the speckle patterns.

14. Apparatus for the detection of a subsurface vessel, comprising
 a double pulse laser located above the sea surface and generating a collinated double pulse output;
 laser beam direction-determining optics for projecting the collinated double pulse output of said laser through the air/sea interface to illuminate a water column;
 at least one detector array for detecting sub-sea returns from particles in said water column so as to produce sequential speckle patterns corresponding to the arrival of the sequential pulses reflected from said particles; and,
 a cross-correlator coupled to said sequential speckle patterns for cross-correlating said speckle patterns to generate a signal indicative of the degree of decorrelation of said successive speckle patterns, whereby decorrelation above a predetermined threshold is indicative of a subsurface vessel moving through the water.

15. The apparatus of claim 14, and further including a range gate coupled to said detector array for activating said array at a predetermined delay time with respect to the generation of said double pulse output, said predetermined delay determining what segment of said water column is probed and the depth thereof.

16. The apparatus of claim 15, wherein said range gate is set to exclude reflected returns from the air/sea interface.

17. The apparatus of claim 14, wherein said double pulse laser includes a Nd:YAG laser.

18. The apparatus of claim 14, wherein the spacing between said double pulses is between 10 and 100 microseconds.

19. A method for ascertaining the presence of a submersed vessel moving through a body of water, comprising the steps of:
 illuminating the surface of the water with the output of a double pulsed laser;
 detecting returns from particles in the water caused to move by the wake produced by the submersed vessel to form a speckle pattern for each returned pulse;
 cross-correlating successive speckle patterns produced from returns from successive laser pulses; and,
 determining from the average decorrelation of the speckle patterns the presence of the submersed vessel.

20. The method of claim 19, and further including the step of determining the direction of travel of the submersed vessel from the cross-correlation step.

21. The method of claim 19, and further including the steps of flying the double pulse laser in a predetermined pattern so as to successively illuminate different portions of the surface of the water at known locations, and determining from the locations at which the subsurface vessel is detected, the track of the submersed vessel.

22. The method of claim 21, and further including the step of determining how far the submersed vessel is from the illuminated portion by the level of decorrelation detected.

23. The method of claim 19, and further including range gating the returns to detect the depth of the wake produced by the submersed vessel.

* * * * *